United States Patent
Lin

(10) Patent No.: US 6,611,251 B2
(45) Date of Patent: Aug. 26, 2003

(54) STRUCTURE FOR HIGH RESOLUTION MOUSE

(75) Inventor: Chia-Hui Lin, Hsin Tsin (TW)

(73) Assignee: Prodigit Electronics Co., Ltd., Taipei (TW)

( * ) Notice: Subject to any disclaimer, the term of this patent is extended or adjusted under 35 U.S.C. 154(b) by 250 days.

(21) Appl. No.: 09/867,483

(22) Filed: May 31, 2001

(65) Prior Publication Data

US 2002/0180702 A1 Dec. 5, 2002

(51) Int. Cl.[7] ................................................ G09G 5/08
(52) U.S. Cl. ........................................ 345/163; 345/167
(58) Field of Search ................................ 345/163, 166, 345/158, 164, 165, 169, 167; 250/221, 231.18; 341/2, 9

(56) References Cited

U.S. PATENT DOCUMENTS

| | | | | |
|---|---|---|---|---|
| 4,868,549 A | * | 9/1989 | Affinito et al. | 345/164 |
| 5,280,276 A | * | 1/1994 | Kwok | 345/167 |
| 5,559,534 A | * | 9/1996 | Lin | 345/165 |
| 6,111,563 A | * | 8/2000 | Hines | 345/166 |
| 6,188,393 B1 | * | 2/2001 | Shu | 345/184 |
| 6,256,013 B1 | * | 7/2001 | Siddiqui | 345/163 |
| 6,281,881 B1 | * | 8/2001 | Siddiqui et al. | 345/164 |
| 6,351,224 B1 | * | 2/2002 | Wang | 341/2 |
| 6,486,463 B1 | * | 11/2002 | Bidiville et al. | 250/221 |
| 2002/0054023 A1 | * | 5/2002 | Adan et al. | 345/163 |

* cited by examiner

Primary Examiner—Vijay Shankar
Assistant Examiner—Nitin Patel
(74) Attorney, Agent, or Firm—Rosenberg, Klein & Lee

(57) ABSTRACT

Improved structure for high resolution mouse is equipped with a frictional sleeve on each one of a pair of transmission shafts with transmission wheel circumferential length multiple of that of corresponding frictional sleeves so as to increase rotational ratio and facilitate an associated pair of infrared detectors able to detect bright/dark intermitten variation of light imput more distinctly and reliably from a pair of light shading wheels in a given time duration and send out corresponding high resolution (DPT) signals.

4 Claims, 4 Drawing Sheets

STRUCTURE FOR HIGH RESOLUTION MOUSE

BACKGROUND OF THE INVENTION

1. Field of the Invention

The present invention relates to improved structure for high resolution mouse, in particular, to a mouse equipped with a frictional sleeve on each one of two pairs of transmission shafts with wheel circumferential length multiple of that of corresponding sleeve so as to increase rotational ratio and fasilitate an associated pair of infrared detectors able to detect bright/dark intermittent variation of light input more distinctly and reliably from a pair of light shading wheels in a given time duration and deliver corresponding high resolution (Dot Per Inch, DPI) signals.

2. Description of the Prior Art

Among variety of mice usable for computers, the mechanical type is mostly welcome for its reliability and low price. But there is a problem that resolution (Dot Per Inch, DPI) is poor due to difficulty in its mold design and manufacturing. As a result, in order to improve DPI of a mouse, most of the manufacturers think it is better to invest in manufacturing high DPI yet costy photoactive mice without consideration of user's financial burden.

Meanwhile, in a conventional castor equipped mechanical mouse shown in FIG. 4 wherein a frictional rubber castor is equipped to roll on a table or a mouse mat thereby driving an infrare ray shading wheel in a housing of the mouse with 1:1 transmission ratio between the castor and the shading wheel. By so, the castor has to travel a considerably long distance before it reaches the desired spot. Such is not only inconvenient to the operator, but also degrades the sensibity and shortening the life time of a mouse for the reason that the mouse may possibly be accumulating dust on its castor during a long journey.

In order to solve the above depicted problems, the present inventor has carried out theoretical studies and simulating experiments for a long time efforts. Based on these studies and researches, the present inventor came to propose the present invention.

SUMMARY OF THE INVENTION

Therefore, it is an object of the present invention to provide a high resolution mouse which is equipped with a frictional sleeve on each one of a pair of transmission shafts with transmission wheel circumferential length multiple of that of corresponding selves so as to increase rotational ratio and fasilitate an associated pair of infrared detectors able to detect bright/dark intermittent variation of light input more distinctly and reliably from a pair of light shading wheels in a given time duration and send out corresponding high resolution (DPT) signals.

It is another object of the present inventional to provide a high resolution mouse whose rotational ratio between the transmission wheel and the frictional sleeve is adjustable according to desired resolution.

It is a further object of the present invention to provide a high resolution mouse whose small distance of displacement is equivalent to a large step displacement made by a conventional mechanical mouse so as to eliminate the disadvantageous accumulation of dust on the castor and prolong lifetime of the mouse.

It is still further object of the present invention to provide a high resolution mouse with a low production cost and cheap market prices as well.

To achieve these and other objects, the high resolution mouse of the present invention comprises a spherical castor; a first transmission wheel unit including a transmission wheel whose rotating shaft is equipped with a first frictional sleeve at a proper position thereof; a second transmission wheel unit including a transmission wheel whose rotating shaft is equipped with a first frictional sleeve at a proper position thereof; a light shading wheel whose rotating shaft is equipped with a second frictional sleeve at a proper position thereof; a light shading wheel whose rotating shaft is equipped with a second frictional sleeve at a proper position thereof; several supporting posts for sustaining the first and the second transmission wheel units; and two infrared sensors.

With the above structure the spherical castor is in contact with the first frictional sleeves of the first and the second transmission wheel units, the transmission wheel of the first transmission wheel unit is in contact with the second frictional sleeve of the first transmission wheel unit, and the transmission wheel of the second transmission wheel unit is in contact with the second frictional sleeve of the second transmission wheel unit. Each of the two infrared sensors is respectively disposed abut on each of the light shading wheels belonging to the first and second transmission wheel units respectively for detecting bright/dark change of light and delivering corresponding DPI signals.

In the present invention, all the frictional sleeves are of cylindrical shape, and the circumferential length of the transmission wheels is multiple of that of corresponding sleeves, and the ratio is variable so as to improve resolution of the mouse to any desired degree.

In the present invention, the fringes of both transmission wheels are serrated so as to stabilize rotation of the transmission wheels.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
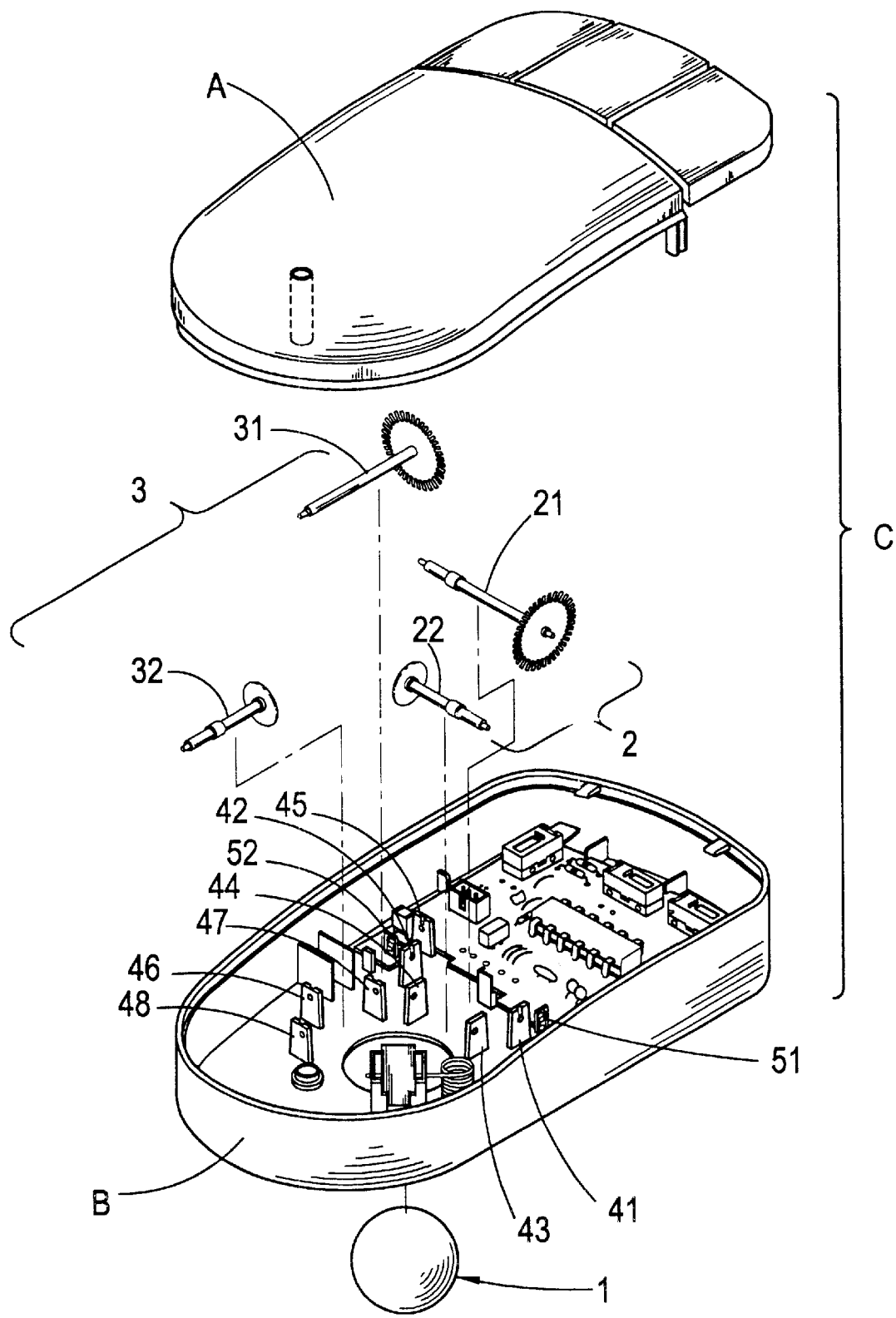
FIG. 1 is an illustrative three dimensional view showing component parts of the present invention.

FIG. 1 is an illustrative three dimensional view showing component part of the present invention, the mouse of the present invention is composed of a spherical castor 1, a first transmission wheel unit 2, a second transmission wheel unit 3, several supporting posts 41, 42, 43, 44, 45, 46 and 47, and two infrared sensors 51 and 52, all accommodated in a housing C formed of an upper cover A and a lower case B.

Figure 2:
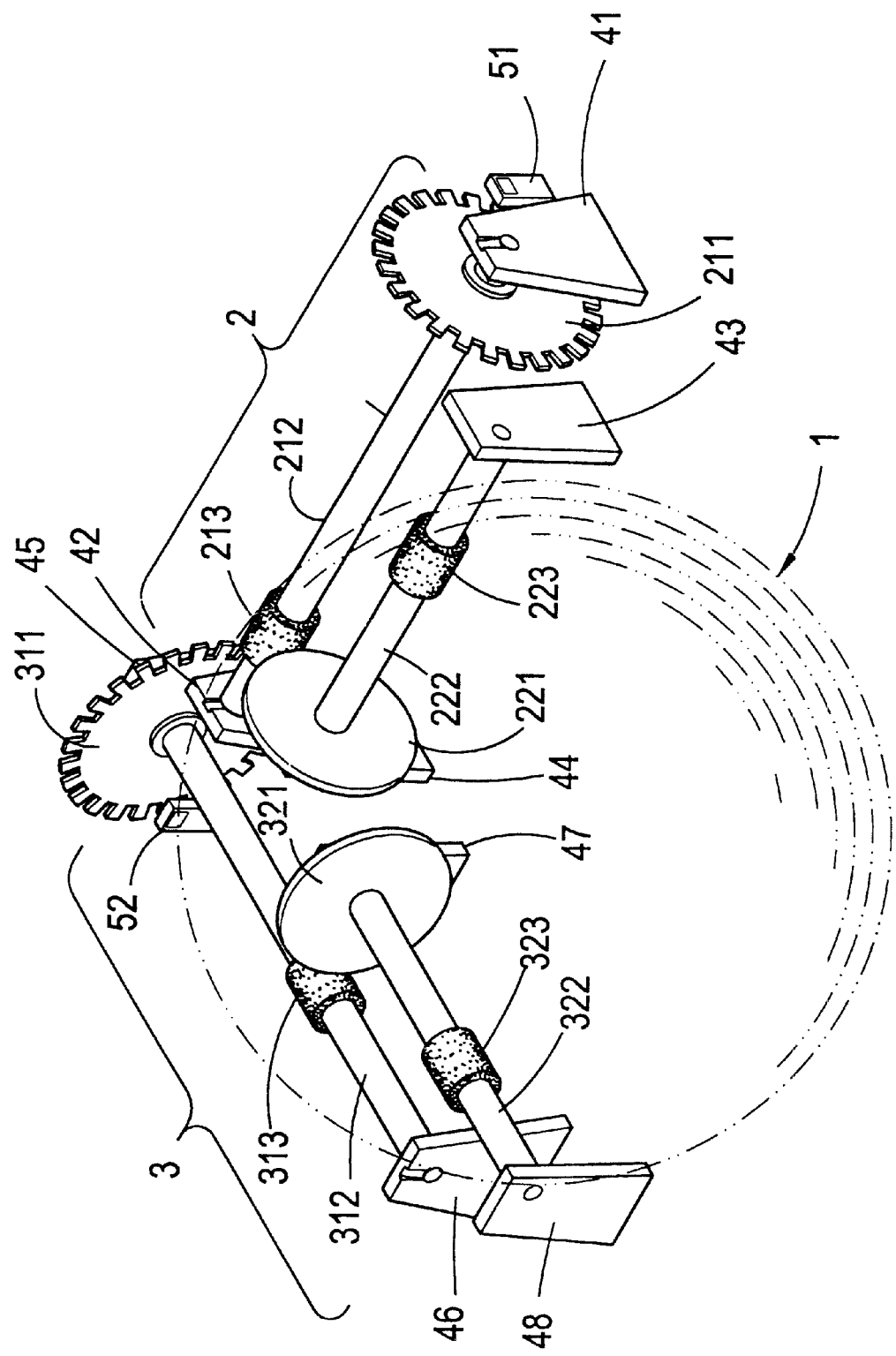
FIG. 2 is a three dimensional assembly view of the present invention.
Figure 3:
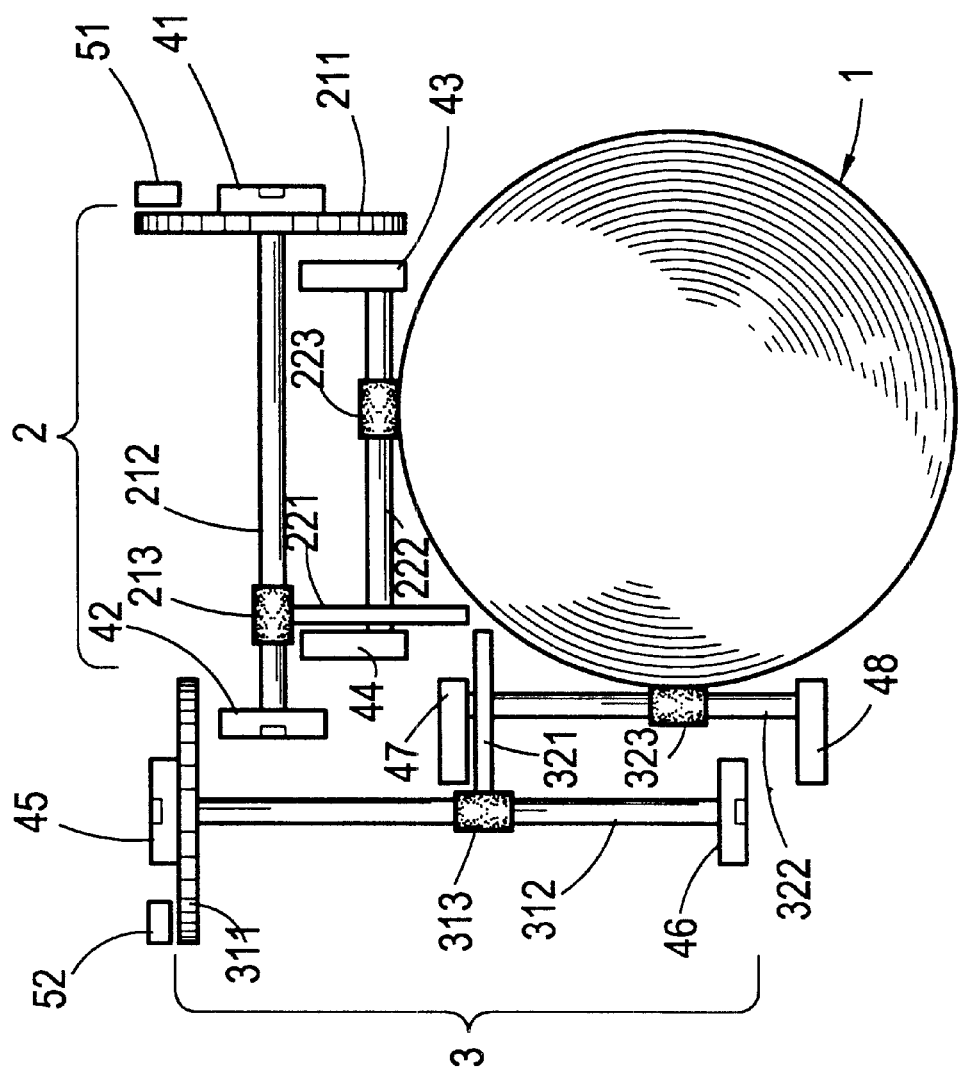
FIG. 3 is a top view of the present invention.
Figure 4:
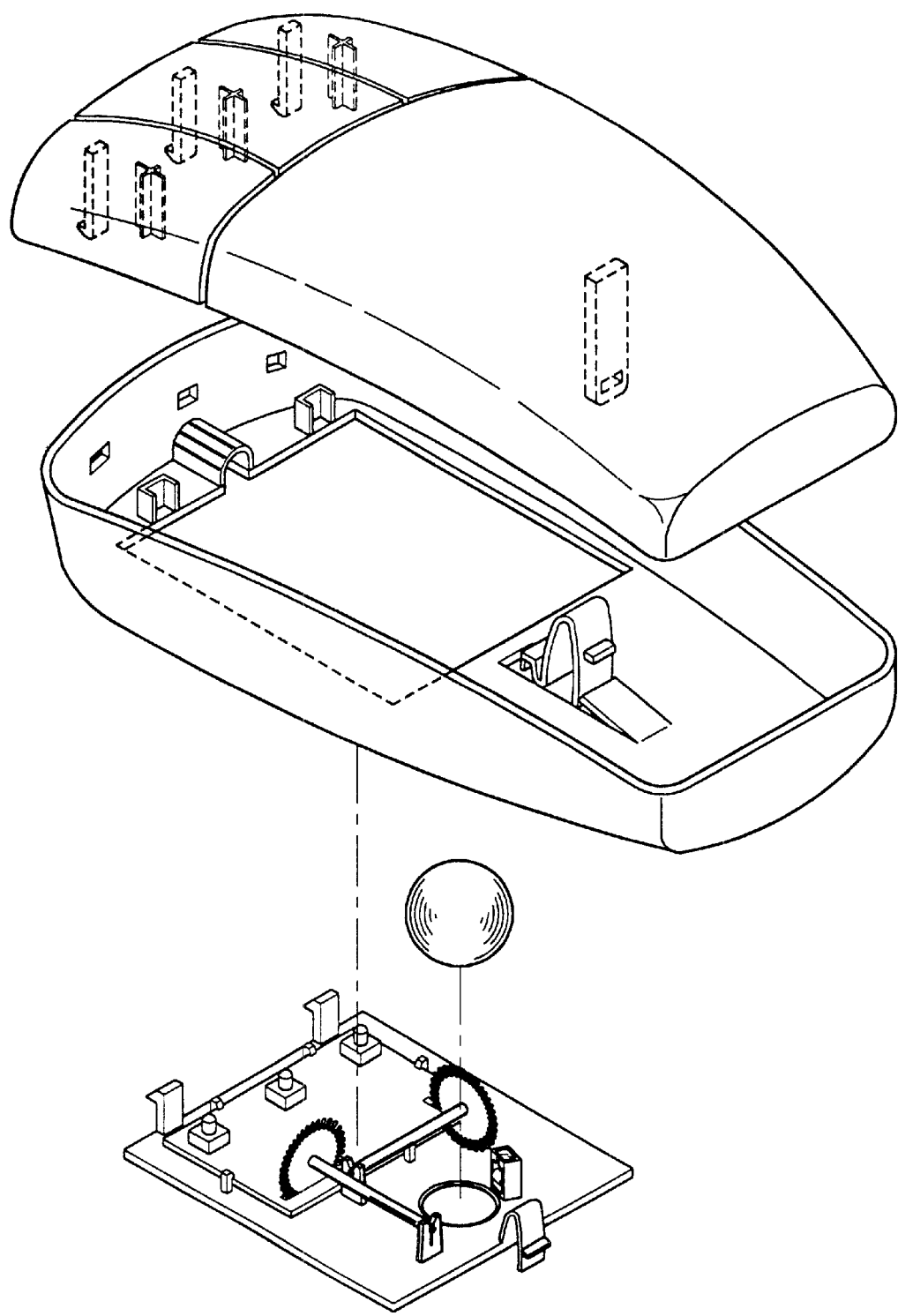
FIG. 4 is an illustrative view showing the transmission mechanism of a comventional computer mouse.

Referring to FIGS. 2 and 3 simultaneously, where FIG. 2 is a three dimensional assembly view, and FIG. 3 is the top view of the present invention. From these two drawings it is understood that the first transmission wheel unit 2 further includes a serrated transmission wheel 221 whose rotating shaft 222 being equipped with a cylindrical first frictional sleeve 223 at a proper position thereof, and the shaft 222 is rotatably sustained by the supporting posts 43 and 44. A light shading wheel 221 whose rotating shaft 212 is equipped with a cylindrical second frictional sleeve 213, the shaft 212 is rotatably sustained by the supporting posts 41 and 42. The second transmission wheel unit 3 further includes serrated transmission wheel 321 whose rotating shaft 322 being equipped with a cylindrical first frictional sleeve 323 at a proper position thereof, and the shaft 322 is rotatably sustained by the supporting posts 47 and 48. A light shading wheel 311 whose rotating shaft 312 is equipped with a cylindrical second frictional sleeve 313, the shaft 312 is rotatably sustained by the supporting posts 45 and 46. Each of the two infrared sensors 51 and 52 is respectively disposed abut on each of the light shading wheels 211 and 311 for detecting bright/dark variation of light as the two light shading wheels 211 and 311 are rapidly rotated to deliver corresponding DPI signals.

Returning to FIGS. 2 and 3, when the spherical castor 1 is moved by the housing C, in the firt transmission wheel unit 2, the motion of the castor 1 is transmitted to the light shading wheel 211 sequentially from the friction sleeve 223, the shaft 222, the transmission wheel 221, the shaft 213, and finally to the light shading wheel 211, similarly, in the second trasmission wheel unit 3, the motion of the castor 1 is transmitted to the light shading wheel 311 sequentially from the friction sleeve 323, the shaft 322, the transmission wheel 321, the shaft 313, and finally to the light shading wheel 311. The motion is transmitted by the force produced by frictional contact between the castor 1 and the frictional sleeves 223 and 323, whereas the serration of the transmission wheels 221 and 321 stabilizes the operation of the mechanism. It should be noted that the simultaneous contact between the castor 1 and the frictional sleeves 233 and 323 causes bright/dark change of light at two different positions for the detectors 51 and 52 to pick up, and the moving direction and speed of the mouse are monitored by an inner circuit of the mouse with a very high DIP. Meanwhile, the circumferential length of the transmission wheels 221 and 321 is multiple of that of corresponding frictional sleeves 223 and 323, and the ratio thereof is variable so as to improve resolution of the mouse to any desired degree.

It emerges from the above description that the invention has several moteworthy advantages, in particular:

1. Resolution of the mouse is greatly improved.
2. A small displacement of the mouse according to the present invention is equivalent to a large step displacement of a conventional mechanical mouse so that the disadvantageous accumulation of dust on the castor is eliminated and lifetime of the mouse is prolonged.
3. The high resolution mouse of the present invention can be provided with cheap production cost that causes users to enjoy cheap market price.

Those who are skilled in the art will readily perceive how to modify the invention. Therefore the appended claims are to be construed to cover all equivalent structures which fall within the true scope and spirit of the invention.

What is claimed is:

1. A high resolution mouse structure comprising:

a spherical castor;

a first transmission wheel unit including a transmission wheel whose rotating shaft being equipped with a first frictional sleeve at a proper position thereof, a light shading wheel whose rotating shaft being equipped with a second frictional sleeve at a proper position hereof;

a second transmission wheel unit including a transmission wheel whose rotating shaft being equipped with a first frictional sleeve at a proper position thereof, and a light shading wheel whose rotating shaft being equipped with a second frictional sleeve at a proper position thereof;

several supporting posts for sustaining said first and said second transmission wheel units; and two infrared sensors;

with the above structure said spherical castor is in contact with said first frictional sleeves of said first and said second transmission wheel units, the transmission wheel of said first transmission wheel unit is in contact with said second frictional sleeve of said first transmission wheel unit, and the transmission wheel of said second transmission wheel unit is in contact with said second frictional sleeve of said second transmission wheel unit, each of said two infrared sensor are respectively disposed adjacent each of said two light shading wheels belonging to said first and said second transmission wheel units respectively for detecting bright/dark change of light and delivering corresponding DPI signals.

2. Improved structure for high resolution mouse of claim 1, wherein all said frictional sleeves are of cylindrical shape.

3. Improved structure for high resolution mouse of claim 1, wherein the circumferential length of said two transmission wheels is multiple of that of said corresponding frictional sleeves so as to improve resolution of said mouse.

4. Improved structure for high resolution mouse of claim 1, wherein the circumferential fringes of both said transmission wheels are serrated.

* * * * *